(12) United States Patent
Forrester (10) Patent No.: US 8,104,042 B2
(45) Date of Patent: *Jan. 24, 2012

(54) LOAD BALANCING OF SERVERS IN A CLUSTER

(75) Inventor: Jason D. Forrester, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 932 days.

This patent is subject to a terminal disclaimer.

(21) Appl. No.: 12/115,972

(22) Filed: May 6, 2008

(65) Prior Publication Data

US 2008/0209044 A1    Aug. 28, 2008

Related U.S. Application Data

(63) Continuation of application No. 10/703,900, filed on Nov. 6, 2003, now Pat. No. 7,389,510.

(51) Int. Cl.
*G06F 9/46* (2006.01)
*G06F 15/173* (2006.01)

(52) U.S. Cl. ........ 718/105; 718/104; 709/223; 709/224; 709/226

(58) Field of Classification Search .................... 718/105
See application file for complete search history.

(56) References Cited

U.S. PATENT DOCUMENTS

| | | | |
|---|---|---|---|
| 5,870,561 | A | 2/1999 | Jarvis et al. |
| 5,926,619 | A | 7/1999 | Badovinatz et al. |
| 6,078,943 | A | 6/2000 | Yu |
| 6,119,143 | A | 9/2000 | Dias et al. |
| 6,185,601 | B1 | 2/2001 | Wolff |
| 6,389,448 | B1 | 5/2002 | Primak et al. |
| 6,397,345 | B1 | 5/2002 | Edmonds |
| 6,412,079 | B1 | 6/2002 | Edmonds |
| 6,574,612 | B1 | 6/2003 | Baratti et al. |
| 6,792,463 | B1 | 9/2004 | Lamberton et al. |
| 7,062,556 | B1 | 6/2006 | Chen et al. |
| 7,181,524 | B1 | 2/2007 | Lele |

(Continued)

FOREIGN PATENT DOCUMENTS

JP        11004261 A    2/2002

(Continued)

OTHER PUBLICATIONS

Hou, T. et al., "An Access-Based Clustering Protocol for Multihop Wireless Ad Hoc Networks", IEEE, 2001, pp. 1201-1210.

(Continued)

*Primary Examiner* — Jennifer To
(74) *Attorney, Agent, or Firm* — Arthur J. Samodovitz (57) ABSTRACT

A system, method and program product for operating a cluster of servers. A load balancer, separate from the servers, selects servers to handle respective work requests assigned to the cluster based on a load balancing algorithm, and sends the work requests to the selected servers. The load balancer receives a request from another server not currently a member of the cluster. The request requests that the other server become a member of the cluster to handle work requests. In response to the request, the load balancer joins the other server as a member of the cluster to handle some work requests subsequently assigned to the cluster. The other server specifies to the load balancer a load threshold for the other server. The other server specifies to the load balancer a time-out to be used for the other server. The time-out indicates a time allotted for the other server to send a hello message since sending a previous hello message.

18 Claims, 4 Drawing Sheets

U.S. PATENT DOCUMENTS

| | | |
|---|---|---|
| 7,185,096 B2 | 2/2007 | Kalyanavarathan et al. |
| 2002/0010783 A1 | 1/2002 | Primak et al. |
| 2002/0038371 A1 | 3/2002 | Spacey |
| 2002/0087612 A1 | 7/2002 | Harper et al. |
| 2003/0033428 A1 | 2/2003 | Yadav |
| 2004/0205250 A1 | 10/2004 | Bain et al. |
| 2005/0050161 A1 | 3/2005 | Arnold et al. |
| 2005/0055435 A1 | 3/2005 | Gbadegesin et al. |
| 2005/0193113 A1 | 9/2005 | Kokusho et al. |

FOREIGN PATENT DOCUMENTS

| | | |
|---|---|---|
| WO | 0113228 A2 | 2/2001 |

OTHER PUBLICATIONS

Kim, Myung-Sup et al., "A Load Cluster Management System Using SNMP and Web", International Journal of Network Management 2002, pp. 367-378.

Cardellini, Valeria et al., "The State of the Art in Locally Distributed Web-Server Systems", ACM Computing Surveys, vol. 34, No. 2, Jun. 2002, pp. 263-311.

Mohamed-Salem, M. et al., "Scaling Server Selection Using a Multi-Broker Architecture", IEEE, 2003, pp. 1-6.

Castro, M. et al., "Scalable Application-Level Anycast for Highly Dynamic Groups", Microsoft Research, 2003, pp. 1-11.

LOAD BALANCING OF SERVERS IN A CLUSTER

CROSS REFERENCE TO RELATED APPLICATION

This is a Continuation application of U.S. patent application Ser. No. 10/703,900 filed Nov. 6, 2003 and now U.S. Pat. No. 7,389,510.

FIELD OF THE INVENTION

The invention relates generally to computer systems, and deals more particularly with load balancing of servers in a cluster.

BACKGROUND OF INVENTION

Servers perform various tasks for clients such as furnishing web pages, hosting content, storing data and hosting applications. It was known to arrange two or more similar servers in a cluster for redundancy; in case one server failed, there would still be one server to handle the work requests of the clients. It was also known to arrange similar servers in a cluster to increase the overall computing resources available to the clients. In both cases, a load balancing computer, separate from the servers in the cluster, determined which server to route each new client request. The load balancing computer was located between the clients and the cluster of servers. Different load balancing algorithms are currently known. These include a simple round robin algorithm where the different servers in the cluster are sequentially assigned work requests as they are received by the load balancer. Other load balancing algorithms are more sophisticated and consider the length of the current work queue of each server and/or the current response time of each server. In these more sophisticated algorithms, new client requests are routed to the server with the shortest current work queue or shortest current response time. In those clusters where the servers are not all identical, a known load balancer may consider the type of client request and the server with the best configuration or resources to handle the type of client request.

It was also known for the servers in the cluster to periodically send to the load balancer a "hello" message or "heartbeat" to indicate that the server is still running and not severely overloaded. If the load balancer does not receive the hello message within a predetermined time interval (or "time-out") of the previous hello message, then the load balancer may assume that the server is "down" and then remove the server from the cluster. In such a case, the load balancer will not assign any new client requests to this server until the server reestablishes its viability with the load balancer.

It was also known for the load balancer to monitor the work load of the cluster and of individual servers in the cluster. The work load was measured by the number of message packets received in the client requests, over a time interval. The length of the message packets in the client requests is loosely correlated to the work required to handle the request. If the work load exceeded a threshold for the cluster or any server in the cluster, then the load balancer may request help from additional resources on the network by sending the request to servers that are configured to lend available resources. Upon a successful request for additional resources, this would start the process as defined in the Join-Request Process.

Currently, the parameters defining the clustering, i.e. which servers are in the cluster to receive and handle client requests, what load balancing algorithm to use for the cluster, what hello message interval to use for each server, and what time-out to use for each server, are specified in the configuration of the load balancer. Some of these parameters are default parameters of the load balancing program, and others are input by an administrator of the load balancer. (Although as noted above, if a load balancer was initially configured to include a certain server as part of the cluster, and this server goes down, then the load balancer will remove this server from the cluster, until such time as the server reestablishes its viability to the load balancer.) While the foregoing technique to define the parameters was effective, it relied too heavily on the knowledge and foresight of the administrator of the load balancer. Also, it some cases, it was not sufficiently dynamic enough to account for change of circumstances.

Therefore, an object of the present invention is to improve the process of defining parameters of a cluster of servers.

SUMMARY OF THE INVENTION

The invention resides in a system, method and program product for operating a cluster of servers. A load balancer, separate from the servers, selects servers to handle respective work requests assigned to the cluster based on a load balancing algorithm, and sends the work requests to the selected servers. The load balancer receives a request from another server not currently a member of the cluster. The request requests that the other server become a member of the cluster to handle work requests. In response to the request, the load balancer joins the other server as a member of the cluster to handle some work requests subsequently assigned to the cluster.

In accordance with one feature of the invention, the other server specifies to the load balancer a preferred load balancing algorithm to be used for assigning work requests to servers in the cluster.

In accordance with another feature of the invention, the other server specifies to the load balancer a load threshold for the other server.

In accordance with another feature of the invention, the other server specifies to the load balancer a time-out to be used for the other server. The time-out indicates a time allotted for the other server to send a hello message since sending a previous hello message.

DETAILED DESCRIPTION OF THE PREFERRED EMBODIMENTS

Figure 1:
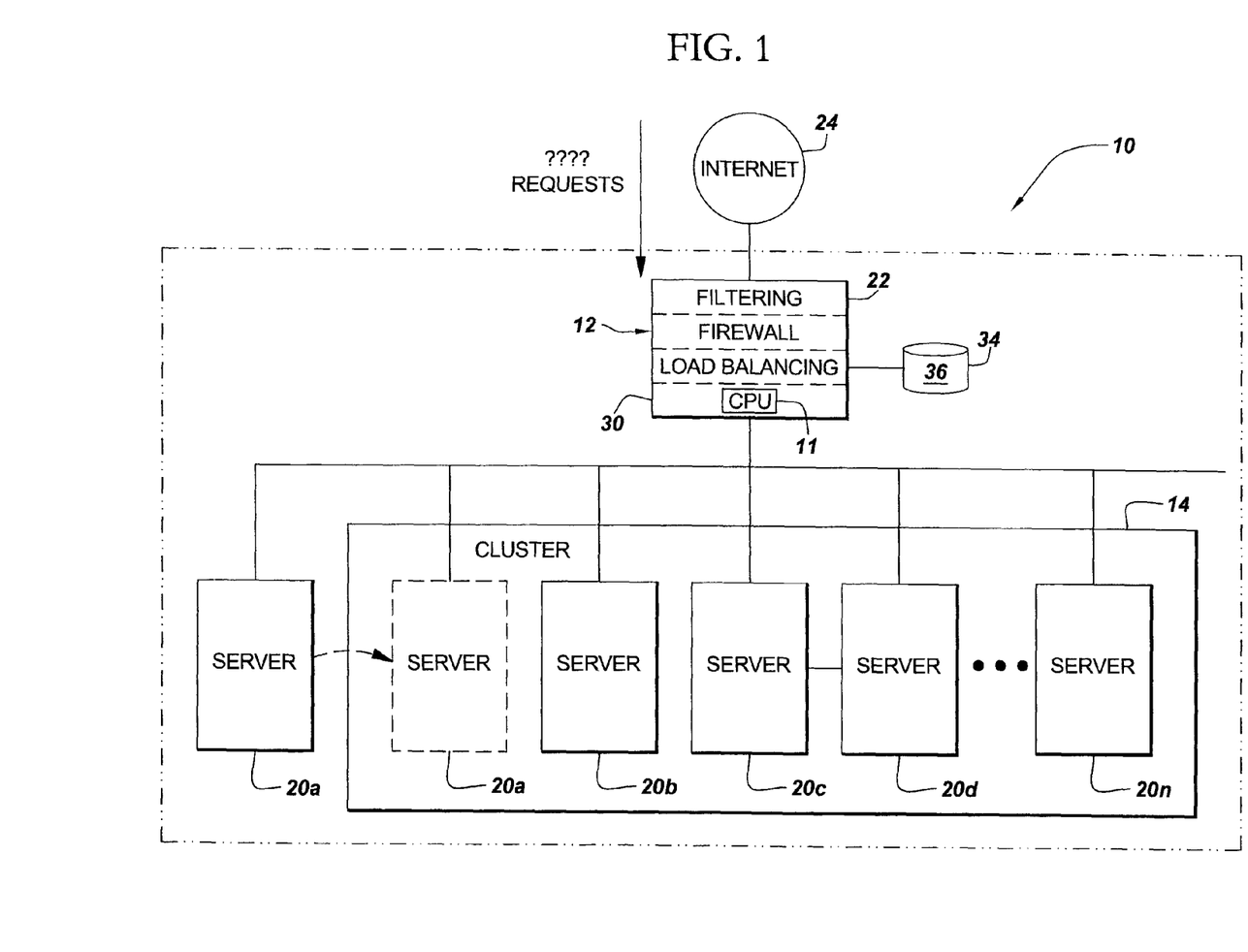
FIG. 1 is a block diagram of a computer system including a load balancing program within a firewall and a cluster of servers, according to one embodiment of the present invention.

Referring now to the drawings in detail wherein like reference numbers indicate like elements, FIG. 1 illustrates a computer system generally designated 10 according to one embodiment of the present invention. System 10 comprises a firewall 12 for a cluster 14 of servers 20a,b,c,d . . . n. (As shown in FIG. 1, server 20a is initially outside of cluster 14, but later joins the cluster 14 pursuant to the steps of FIG. 2.) Servers 20a-n reside on a network such as ethernet, token ring or Fiber Distributed Data Interface (FDDI). However, the present invention works at layer three of the Open Systems Interconnection (OSI) Reference Model, so layer two media such as token ring, ethernet, fddi are transparent. Firewall 12 comprises a computer with a central processing unit (CPU) 11 and a known filtering program 22 which filters incoming messages from Internet 24, for security reasons. The known filtering program may base its filtering decisions on the Internet Protocol (IP) protocol, protocol port, source IP address, destination IP address and known state of the message.

Firewall 12 also includes a load balancing program 30 according to the present invention. A storage device 34 such as a disk storage includes a configuration file 36 for load balancing program 30. Storage device 34 includes a variety of different load balancing program routines for servers 20a-n and also stores the remainder of load balancing program 30. By way of example, one load balancing routine is a simple "round robin" algorithm where incoming work requests are assigned sequentially to the servers in the cluster. Another load balancing routine assigns new work requests to the server with the shortest current work queue. Another load balancing routine assigns new work requests to the server with the fastest current response time. Configuration file 36 includes load balancing parameters for servers 20a-n, as described in more detail below.

Load balancing program 30 is initially configured with default parameters and/or by an administrator of the firewall 12 who can override the default parameters and supply other parameters. The following is an example of parameters of an initial configuration for cluster 14 of servers:

identity of a load balancing routine for the cluster. The load balancing routine is configured by an administrator at start up to use a specific load balancing algorithm. The initial setup of a device that wants to be load balanced can request the use of a different load balancing algorithm during the Join-Request process.

identity (IP address) of each server in the cluster load threshold for each server, i.e. the number of message packets over a certain time interval that represent work requests and can be handled by the respective server. This incoming message packet rate loosely correlates to the amount of work required of the respective server to respond to the request. Different servers in the cluster can have different load thresholds.

hello interval, i.e. each server in the cluster is expected to send to the load balancing program a "hello" message periodically, for example, every ten seconds, to prove that the server is still "up" and available to handle work requests from the load balancing program.

time-out, i.e. how long the load balancing program will wait after receipt of each hello message for the next hello message before assuming that the server is down or severely overloaded. When a hello message is received, the load balancing program initiates a time-out clock, for example, thirty seconds. If the next hello message is not received before expiration of the time-out clock, then the load balancing program will assume that the server is down or severely overloaded, and remove the server from the cluster. Once removed, the load balancing program will not assign any subsequent work requests to this server, unless it rejoins the cluster. Any work requests previously assigned to this server that are not completed (as indicated by an acknowledgment by the server at the TCP/IP layer) will be reassigned by the load balancing program to another server in the cluster.

authentication, i.e. the shared password used to authenticate members of the cluster who wish to participate.

Figure 2:
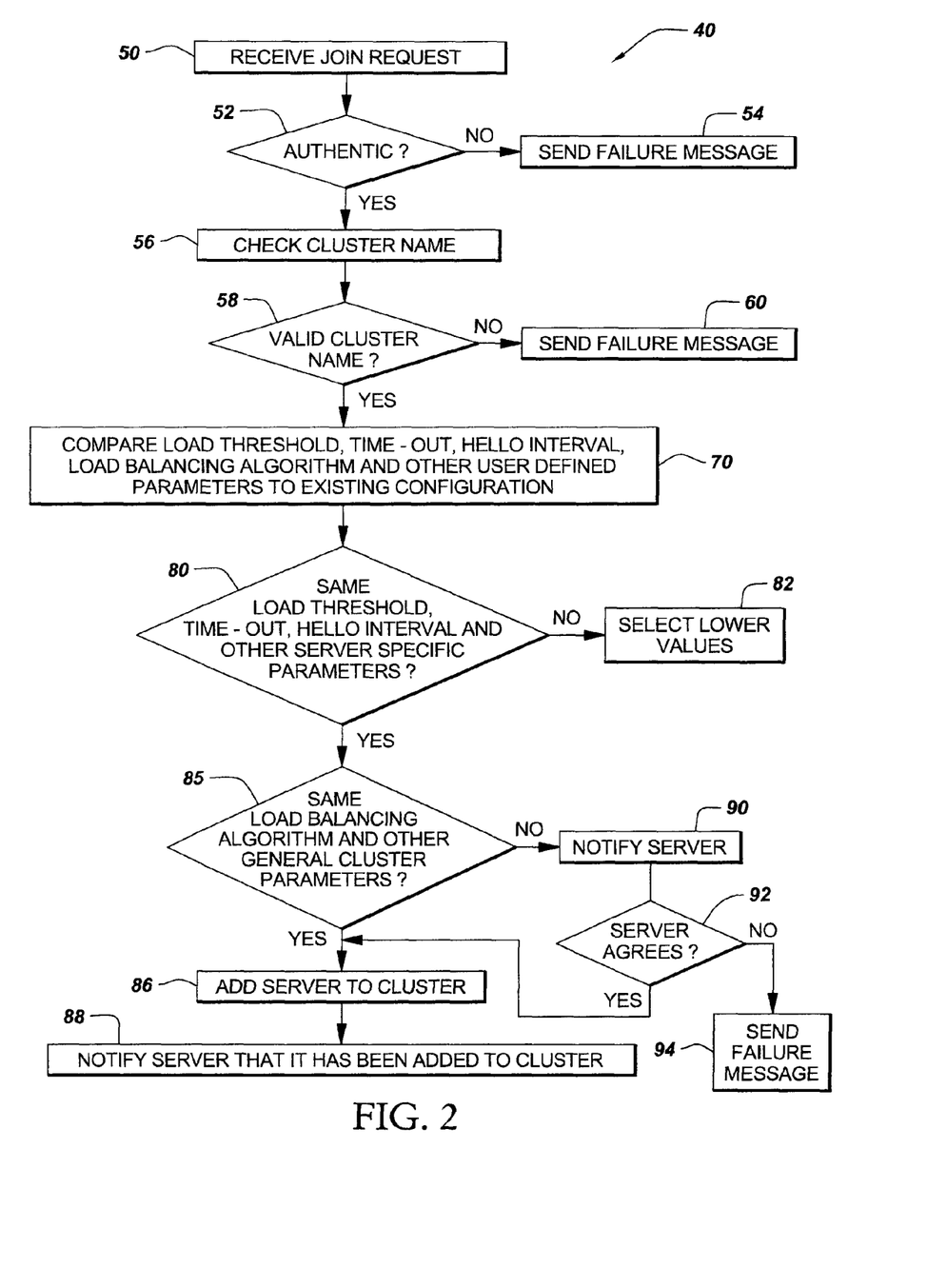
FIG. 2 is a flow chart illustrating a join function, initiated by a server, within the load balancing program of FIG. 1.

FIG. 2 illustrates a join function 40 within load balancing program 30. The join function is invoked by a join request initiated by (a) programming within a server not currently in a cluster or (b) an administrator of the server, to join the server into a specific cluster. When the decision is made by programming within the server, the decision can be based on under utilization of the server as measured by CPU monitoring hardware or software. When the decision is made by an administrator of the server, the decision can be based on under utilization of the server or installation/building of a new server that is looking for a cluster to join. In the case of the server programming making the decision, the server programming creates a request, including the requisite cluster parameters, to join a named cluster. In the case of the administrator making the decision, the administrator enters into server 20a a command to join a named cluster and other cluster parameters (as described below), and programming within server 20a generates the join request. (The load balancing program 30 can periodically broadcast to the available servers the identities of the existing clusters, or the administrator can learn the identities of the existing clusters by manually checking the configuration of the load balancer 30.) After the join request is created, it is sent to the join function 40 within load balancing program 30 within firewall 22 (step 50). The join request includes a pass phrase (i.e. a sophisticated pass word) of the server, an identity (for example, a group identity) of a cluster that the server wants to join, a load threshold for the server, a time-out for the server, a "hello interval" for the server, a desired load balancing algorithm for the cluster and optionally, other user definable parameters for the server or cluster. The load balancing algorithm is the algorithm that server 20a requests to be used for the cluster, such as round robin, shortest work queue, fastest response time, etc.

In response to the join request, join function 40 first determines if the server is authentic by looking up the pass phrase in a list of authentic ones maintained in storage device 34 (decision 52). If not, join function 40 returns a failure message to the server 20a (step 54). If so, join function 40 checks its database 36 to determine if the cluster identity in the request exists (step 56 and decision 58). If not, join function 40 returns a failure message to the server 20a (step 60). If so, join function 40 compares the load threshold, time-out, hello interval, load balancing algorithm and other user definable parameters specified in the join request to those in the existing cluster configuration file 36 (step 70). If any of the server specific parameters, i.e. load threshold, time-out or hello interval are not the same as those in the existing configuration file 36 (decision 80, no branch), then join function 40 determines which server specific parameter should apply to server 20a when part of the named cluster (step 82). In the case of a difference in the load threshold, time-out or hello interval, the join function will select the lower of the thresholds specified by the existing configuration file 36 and the join request. The load threshold is specified for each server, such that different servers in the same cluster can have different load thresholds. So, if the existing configuration file 36 specifies a default value of six hundred packets per second and the server 20a join request specifies five hundred packets per second, then the configuration file 36 will be updated with a load threshold of five hundred packets per second for server 20a. For example, if the existing configuration file 36 specifies a default time-out of thirty seconds, and the join request specifies a time-out of twenty seconds, then the configuration file 36 will be updated with a time-out of twenty seconds. However, if the existing configuration file specifies a default hello interval of ten seconds, and the join request specifies a hello interval of fifteen seconds, then the configuration file 36 will remain with ten seconds for the hello interval.

Next, join function 40 determines if the load balancing algorithm specified in the join request is the same as that listed in the existing configuration file 36 (decision 85). If so, then join function 40 adds server 20a to the named cluster, i.e. will add the IP address of server 20 to a list of servers in the named cluster (step 86). Then, join function 40 returns a message to server 20a indicating that server 20a has been added to the named cluster (step 88). Thereafter, load balancing program 30 will send server 20a work requests along with the other servers in the cluster according to the load balancing algorithm.

Referring again to decision 85, in the case of a difference in the load balancing algorithm specified in the join request compared to that in the existing configuration file 36, join function 40 will notify the server 20a of this difference (step 90). Join function 40 will use the load balancing algorithm listed in the existing configuration file for the cluster when there are other servers in the cluster. The only time a server requesting to join a cluster can select the load balancing algorithm for the cluster, is if the server is the first server in the cluster. If server 20a returns with an agreement message (decision 92, yes branch), then join function 40 will add server 20 to the named cluster, as described above (step 86). If server 20a does not return an agreement message (decision 92, no branch), then join function 40 sends a failure message to server 20a (step 94).

Figure 3:
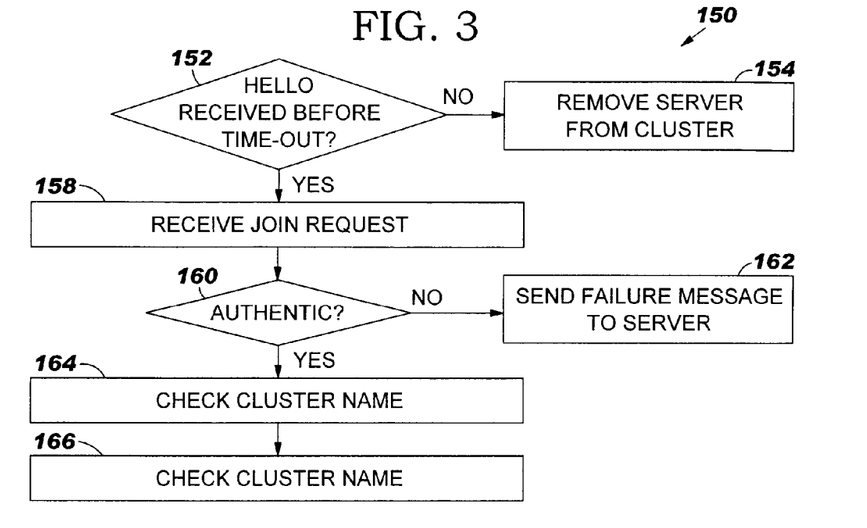
FIG. 3 is a flow chart illustrating a causal removal function initiated by and within the load balancing program of FIG. 1.

FIG. 3 is a flow chart illustrating a causal remove function 150 initiated by load balancing program 30 to remove a server from a cluster for security reasons of if the server is down. If the time-out expires without receipt of the expected hello message (decision 152, no branch), then causal remove function 150 deletes the server from the cluster (step 154). Thereafter, load balancing program 30 will not send any work requests to this server. If the hello message is received before the time-out (decision 152, yes branch), then causal remove function 150 will check the pass phrase which accompanies or is included in the hello message (step 158). If the sender is not authentic (decision 160, no branch), then causal remove function 150 will send a failure message to the sender (step 162). Then, the sender will have the remainder of the time-out period to submit another hello message with a proper pass phrase. Referring again to decision 160, yes branch, where the hello message includes an authentic pass phrase, then causal remove function will reset the timer (step 164) and leave the server in the cluster (step 166).

Figure 4:
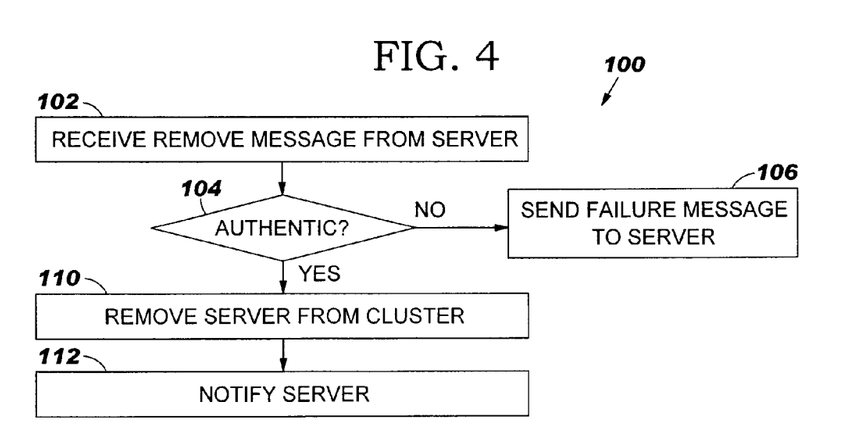
FIG. 4 is a flow chart illustrating a discretionary removal function, initiated by a server, within the load balancing program of FIG. 1.

FIG. 4 is a flow chart illustrating a server initiated, discretionary remove function 100 within load balancing program 30. The discretionary remove function 100 is called by programming within a server currently within a cluster or by an administrator of the server to remove the server from the cluster. When the decision is made by programming within the server, the decision can be based on over utilization of the server. When the decision is made by an administrator of the server, the decision can be based on over utilization of the server or a desire to power-off the server or use the server for other purposes. In the case of the server programming making the decision, the server programming creates a request to remove the server from the cluster. In the case of the administrator making the decision, the administrator enters into the server, for example, server 20a, a command to remove server 20a from a named cluster, and programming within server 20a generates the remove request. After the remove request is created, it is sent to the discretionary remove function 100 within load balancing program 30 within firewall 22 (step 102). The remove request includes a pass phrase of the server and an identity of the cluster from which the server wants to be removed. In response to the remove request, remove function 100 checks the pass phrase of the server. If it is not authentic (decision 104, no branch), then discretionary remove function 100 sends a failure message to server 20a (step 106). However, if server 20a is authenticated, then discretionary remove function 100 removes server 20a from the named cluster (step 110). Discretionary remove function 100 also notifies server 20a that the remove request was fulfilled (step 112). Thereafter, load balancing function 30 will not send any work requests to server 20a that are to be handled by the named cluster.

Figure 5:
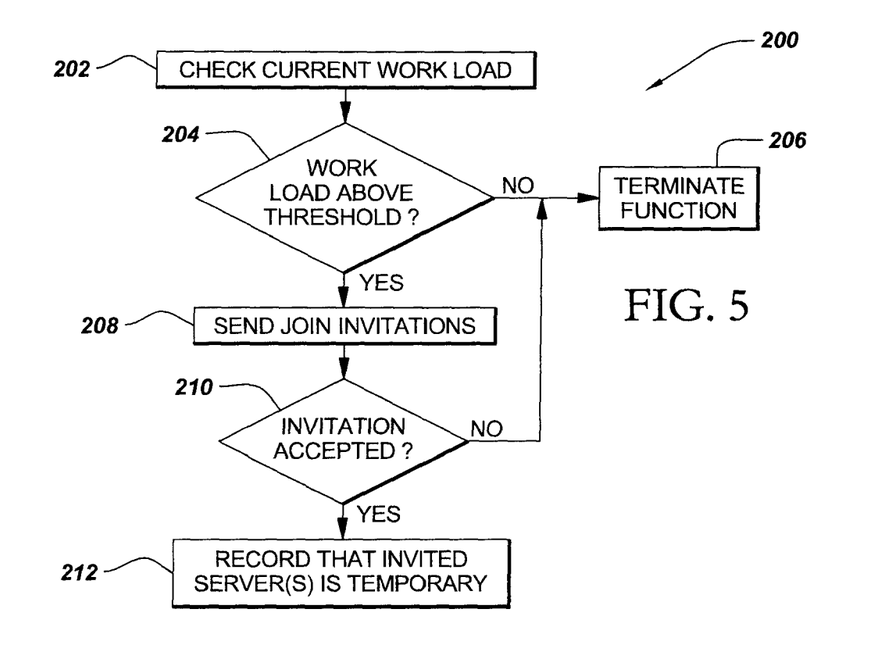
FIG. 5 is a flow chart illustrating a join invitation function initiated by and within the load balancing program of FIG. 1, when an additional server is needed for the cluster.

FIG. 5 is a flow chart illustrating a join invitation function 200 initiated by load balancing program 30 when the load balancing program needs one or more additional servers to handle a high level of work requests for the cluster. Load balancing program 30 periodically checks its current work load for each existing cluster and the servers in each cluster (step 202). If the current work load for each server in a cluster is below the respective load threshold (decision 204, no branch), then join invitation function 200 will terminate itself (step 206). However, if the current work load for any server in a cluster is above the respective load threshold, then join invitation function 200 sends a request to all servers that are potentially available to join the cluster, and not already in the cluster (step 208). It is presumed that if one server in the cluster is above the respective load threshold, that the other servers will be above or near their respective load thresholds. This is because it is presumed that the load balancing algorithm effectively balances the load amongst the servers in the cluster in proportion to their load thresholds or capabilities. The join invitation specifies the cluster that needs one or more additional servers and invites the available servers to volunteer to join the cluster. If none of the available servers that were sent the join invitation responds (decision 210, no branch), then join invitation function 200 terminates itself (step 206). However, if one or more of the available servers that were sent the invitation respond that it/they will comply (decision 210, yes branch), then join invitation function 200 records that when they subsequently join the cluster, their membership will be temporary, i.e. only as long as the work load exceeds the load threshold (step 212). After responding that it/they will comply with the join invitation issued in step 208, the server(s) (either the programming within the server or an administrator of the server) will send a join request to the load balancing program 30, and this join request will be processed by join function 40 as described above with reference to FIG. 2.

Figure 6:
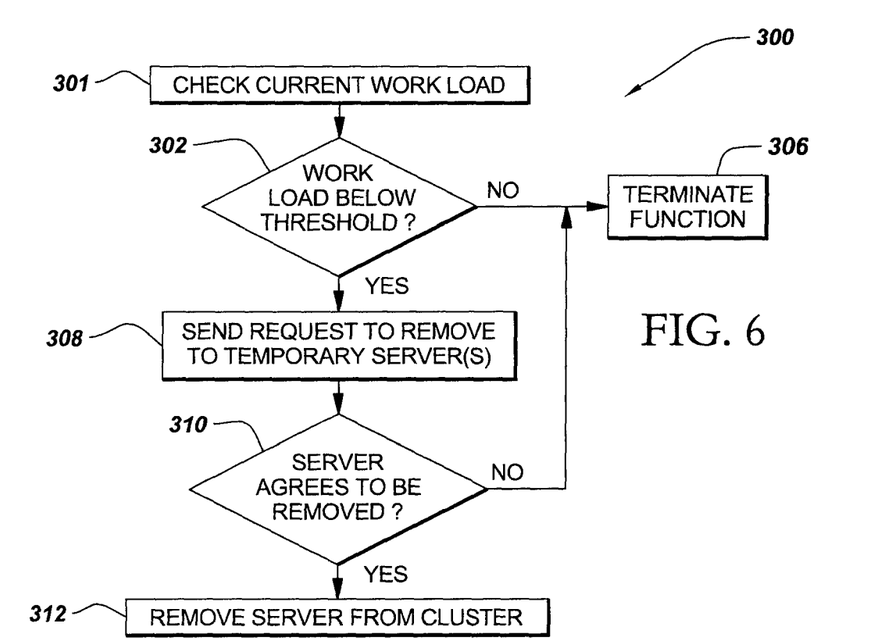
FIG. 6 is a flow chart illustrating a release function, initiated by and within the load balancing program of FIG. 1, when the additional server is no longer needed for the cluster.

FIG. 6 is a flow chart illustrating a release function 300 initiated by load balancing program 30 for one or more servers temporarily added pursuant to the join invitation issued by join invitation function 200. As explained in more detail below, release function 300 releases these one or more additional servers from a cluster when they are no longer needed. Load balancing program 30 periodically compares the current work load for the cluster and the servers in the cluster (step 301). If the current work load for any server in a cluster is above the respective load threshold (decision 302, no branch), then server release function 300 will terminate itself (step 306). However, if the current work load for all servers in the cluster is below the respective load threshold for each server, then release function 300 sends a removal request to all servers that are listed as temporary members of the cluster (step 308). The removal request indicates that the cluster no longer needs their membership and invites these servers to volunteer to be removed from the cluster. If none of these servers responds (decision 310, no branch), then release function 300 terminates itself (step 306). However, if one or more of the temporary members respond that it/they agree to be removed from the cluster (decision 310, yes branch), then release function 300 removes the server(s) from the cluster (step 312). Thereafter, load balancing function 30 will not send to these server(s) any work requests that are to be handled by the cluster.

Based on the foregoing, a system, method and program product for joining and removing servers from a cluster have been disclosed. However, numerous modifications and substitutions can be made without deviating from the scope of the present invention. For example, customized fields can be added to the cluster protocol to handle security management, encryption, and external authentication. Therefore, the present invention has been disclosed by way of illustration and not limitation, and reference should be made to the following claims to determine the scope of the present invention.

The invention claimed is:

1. A method for managing a cluster of servers, the method comprising the steps of:
   a load balancer selecting servers to handle work requests assigned to the cluster based at least in part on a load balancing algorithm, and sending the work requests to the selected servers;
   the load balancer receiving a request, from another server not currently a member of the cluster, to become a member of the cluster to handle work requests at a rate based on a threshold amount of work over a unit of time to respond to work requests assigned by the load balancer to the other server, the load balancer not resident in the other server; and
   in response to the request from the other server, the load balancer joining the other server as a member of the cluster to handle, based on the load balancing algorithm and the threshold amount of work over the unit of time, some work requests subsequently assigned to the cluster.

2. A method as set forth in claim 1 wherein the load balancer subsequently sends work requests to the other server based on the load balancing algorithm and the threshold amount of work over the unit of time.

3. A method as set forth in claim 1 wherein the other server specifies to the load balancer a preferred load balancing algorithm to be used for assigning work requests to servers in the cluster, and the load balancer adopts the preferred load balancing algorithm for the cluster.

4. A method as set forth in claim 1 further comprising the steps of:
   in response to a workload of the cluster of servers or a workload of a server in the cluster reaching a predetermined threshold, the load balancer sending an invitation to one or more additional servers to join the cluster; and
   the load balancer responding to acceptance of the invitation from one or more additional servers by joining to the cluster the one or more additional servers that accepted the invitation.

5. A method as set forth in claim 4 further comprising the steps of:
   in response to the workload of the cluster or the workload of the servers decreasing below a predetermined threshold, the load balancer sending a request to at least one server in the cluster to be removed from the cluster.

6. A method as set forth in claim 1 wherein the threshold amount of work over the unit of time for the other server requesting to become a member of the cluster is different than another threshold amount of work over the unit of time for other servers in the cluster when the other server requesting to become a member of the cluster becomes a member of the cluster.

7. A computer program product, for execution in a load balancer, to manage a cluster of servers, the computer program product comprising:
   a computer-readable, tangible storage device;
   first program instructions to select servers to handle work requests assigned to the cluster based at least in part on a load balancing algorithm, and initiate sending of the work requests to the selected servers;
   second program instructions to receive a request, from another server not currently a member of the cluster, to become a member of the cluster to handle work requests at a rate based on a threshold amount of work over a unit of time to respond to work requests assigned by the load balancer to the other server; and
   third program instructions, responsive to the request from the other server, to join the other server as a member of the cluster to handle, based on the load balancing algorithm and the threshold amount of work over the unit of time, some work requests subsequently assigned to the cluster; and wherein
   the first, second and third program instructions are stored on the computer-readable tangible storage device.

8. A computer program product as set forth in claim 7 wherein the first program instructions subsequently initiate sending of work requests to the other server based on the load balancing algorithm and the threshold amount of work over the unit of time.

9. A computer program product as set forth in claim 7 wherein the second program instructions receive from the other server a specification of a preferred load balancing algorithm to be used for assigning work requests to servers in the cluster, and the second program instructions adopts the preferred load balancing algorithm for the cluster.

10. A computer program product as set forth in claim 7 further comprising:
    fourth program instructions, responsive to a workload of the cluster of servers or a workload of a server in the cluster reaching a predetermined threshold, to initiate sending of an invitation to one or more additional servers to join the cluster; and
    fifth program instructions, responsive to acceptance of the invitation from one or more additional servers, to join to the cluster the one or more additional servers that accepted the invitation; and wherein
    the fourth and fifth program instructions are stored on the computer-readable tangible storage device.

11. A computer program product as set forth in claim 10 further comprising:
    sixth program instructions, responsive to the workload of the cluster or the workload of the servers decreasing below a predetermined threshold, to initiate sending of a request to at least one server in the cluster to be removed from the cluster; and wherein
    the sixth program instructions are stored on the computer readable tangible storage device.

12. A computer program product as set forth in claim 7 wherein the threshold amount of work over the unit of time for the other server requesting to become a member of the cluster is different than another threshold amount of work over the unit of time for other servers in the cluster when the other server requesting to become a member of the cluster becomes a member of the cluster.

13. A load balancer for managing a cluster of servers, the load balancer comprising:
   a central processing unit;
   computer-readable tangible storage device;
   first program instructions to select servers to handle work requests assigned to the cluster based at least in part on a load balancing algorithm, and initiate sending of the work requests to the selected servers;
   second program instructions to receive a request, from another server not currently a member of the cluster, to become a member of the cluster to handle work requests at a rate based on a threshold amount of work over a unit of time to respond to work requests assigned by the load balancer to the other server; and
   third program instructions, responsive to the request from the other server, to join the other server as a member of the cluster to handle, based on the load balancing algorithm and the threshold amount of work over the unit of time, some work requests subsequently assigned to the cluster; and wherein
   the first, second and third program instructions are stored in the computer-readable tangible storage device in the load balancer for execution by the central processing unit.

14. A load balancer as set forth in claim 13 wherein the first program instructions subsequently initiate sending of work requests to the other server based on the load balancing algorithm and the threshold amount of work over the unit of time.

15. A load balancer as set forth in claim 13 wherein the second program instructions receive from the other server a specification of a preferred load balancing algorithm to be used for assigning work requests to servers in the cluster, and the second program instructions adopts the preferred load balancing algorithm for the cluster.

16. A load balancer as set forth in claim 13 further comprising:
   fourth program instructions, responsive to a workload of the cluster of servers or a workload of a server in the cluster reaching a predetermined threshold, to initiate sending of an invitation to one or more additional servers to join the cluster; and
   fifth program instructions, responsive to acceptance of the invitation from one or more additional servers, to join to the cluster the one or more additional servers that accepted the invitation; and wherein
   the fourth and fifth program instructions are stored in the computer-readable tangible storage device in the load balancer for execution by the central processing unit.

17. A load balancer as set forth in claim 16 further comprising:
   sixth program instructions, responsive to the workload of the cluster or the workload of the servers decreasing below a predetermined threshold, to initiate sending of a request to at least one server in the cluster to be removed from the cluster; and wherein the sixth program instructions are stored in the computer-readable storage device in the load balancer for execution by the central processing unit.

18. A load balancer as set forth in claim 13 wherein the threshold amount of work over the unit of time for the other server requesting to become a member of the cluster is different than another threshold amount of work over the unit of time for other servers in the cluster when the other server requesting to become a member of the cluster becomes a member of the cluster.

* * * * *